Patented Oct. 28, 1941

2,260,632

UNITED STATES PATENT OFFICE 2,260,632

ACYLAMINOBENZENESULPHON-HYDROXYAMIDES

Maurice L. Moore, Drexel Hill, and Ellis Miller, Philadelphia, Pa.

No Drawing. Application May 5, 1938, Serial No. 206,279

6 Claims. (Cl. 260—397.7)

This invention relates to new acyl derivatives of p-aminobenzenesulphonhydroxamide in which the acyl group contains at least four carbon atoms. These new compounds are valuable for the treatment of bacterial infections, such as coccus infections.

The new compounds of the present invention may be represented by the general formula

in which R may be alkyl, aryl, aralkyl, alicyclic or heterocyclic, saturated or unsaturated, substituted or unsubstituted, so long as it contains at least three carbon atoms.

The new compounds are white crystalline solids. They are difficultly soluble in water but fairly soluble in alcohol, acetone, and propyleneglycol. They are relatively stable in aqueous solution. On heating in acid solution they readily hydrolyze yielding the corresponding free amine.

These new compounds are readily prepared from the corresponding p-acylaminobenzenesulphonyl halides and salts of hydroxylamine, such as the hydrochloride, by reaction in a basic solvent, such as pyridine, or by suspending the p-acylaminobenzenesulphonyl halide in water, adding an aqueous solution of the hydroxylamine salt and making the mixture alkaline by the addition of a suitable basic material, such as sodium carbonate.

In this specification, and the appended claims, the term "acyl" is used in a broad sense to designate radicals of the type RCO—, in which R represents an organic radical which may be an alkyl, aralkyl, aryl, alicyclic or heterocyclic radical, substituted or unsubstituted, saturated or unsaturated; or, differently defined, the term "acyl" is used to designate broadly the monovalent radicals left when the OH group of the carboxylic radical is removed from the molecule of a carboxylic acid.

A wide range of acid radicals corresponding to carboxylic acids containing at least four carbon atoms may be introduced into the amino group for the production of the new p-acylaminobenzenesulphonhydroxamides. Among these acid radicals are those corresponding to the aliphatic carboxylic acids, such as butyric acid (normal and iso), etc., the aralkyl carboxylic acids, such as benzoic acid, etc., the substituted aralkyl carboxylic acids, such as phenyl chloracetic acid, amino benzoic acid, etc., the heterocyclic carboxylic acids, such as pyromucic acid, the substituted aliphatic carboxylic acids, such as ricinoleic and chlorcaproic acid, etc. Included among the acid radicals which may thus be introduced onto the amino group in producing the new compounds are those corresponding to the following acids:

| | |
|---|---|
| Butyric | Phenylchloracetic |
| Isobutyric | Phenylaminoacetic |
| Valeric | Aminobenzoic |
| Isovaleric | Phenylpropionic |
| Active valeric | Nitrobenzoic |
| Caproic | Pyromucic |
| Alpha chlorcaproic | Cinnamic |
| Heptoic | Chlorbenzoic |
| Caprylic | Sulphobenzoic |
| Capric | Mandelic |
| Lauric | Toluic |
| Palmitic | Hydratropic |
| Oleic | Tolyacetic |
| Stearic | Tropic |
| Ricinoleic | Furalacrylic |
| Myristic | Hexahydrobenzoic |
| Behenic | Cyclopentanecarboxylic |
| Benzoic | Nicotinic |
| Phenylacetic | Thiazole-4-carboxylic |

Such new compounds in which the acyl group contains more than four carbon atoms are valuable for the treatment of bacterial infections, such as coccus infections and particularly streptococcus infections. All of these compounds have more than three carbon atoms in the acyl group. This is essential for therapeutic usefulness, because the corresponding acetyl derivative, for example, which has but two carbon atoms in the acyl group, is not sufficiently active to be useful.

The new acyl derivatives of p-aminobenzenesulphonhydroxamide are relatively non-toxic despite their therapeutic activity. They can be administered in much larger doses than p-aminobenzenesulphonamide, for example, either on the basis of absolute dosage, that is, grams of the compound per kilogram body weight, or on a molal dosage basis, that is, moles of the compound per kilogram body weight. As their therapeutic activity or effectiveness is as high or higher than that of p-aminobenzenesulphonamide, the new compounds are valuable in that they offer a relatively safe and effective treatment of such infections as streptococcus infections, affording protection in doses much smaller than the toxic dose.

The invention will be further illustrated by the following specific examples, although it is not limited thereto:

EXAMPLE 1.—*Preparation of p-n-heptoylamino-* benzenesulphonhydroxamide.—13 parts of hydroxylamine hydrochloride are added to about 100 parts of pyridine. 25 parts of p-n-heptoylaminobenzenesulphonyl chloride are then added slowly with stirring. The stirring is continued until the heat of reaction is dissipated. After the reaction is completed the solution is poured into 250 parts of water containing a small amount of acid to neutralize the pyridine. The p-n-heptoylaminobenzenesulphonhydroxamide separates as a solid which is removed by filtration. It is purified by crystallization from a suitable organic solvent, such as a mixture of water and alcohol. It melts with decomposition at 161–164° C. (uncorrected).

EXAMPLE 2.—*Preparation of p-n-valerylaminobenzenesulphonhydroxamide.*—To a suspension of 20 parts of p-n-valerylaminobenzenesulphonyl chloride in about 100 parts of water are added 12 parts of hydroxylamine hydrochloride in aqueous solution. The resulting mixture is made slightly alkaline by the addition of an aqueous solution of sodium carbonate. It is then warmed with stirring until the suspended material goes into solution. The p-n-valerylaminobenzenesulphonhydroxamide is separated from the solution as a white solid by cooling. It is removed by filtration and purified by crystallization as in Example 1. It melts at 178–179.5° C. (uncorrected) with decomposition.

EXAMPLE 3.—*Preparation of p-n-butyrylaminobenzenesulphonhydroxamide.*—To 11 parts of hydroxylamine hydrochloride in 100 parts of pyridine are added 20 parts of p-n-butyrylaminobenzenesulphonyl chloride. The resulting p-n-butyrylaminobenzenesulphonhydroxamide is separated and purified as in Example 1. It melts at 172–178° C. (uncorrected) with decomposition.

EXAMPLE 4.—*Preparation of p-n-caproylaminobenzenesulphonhydroxamide.*—To 10 parts of hydroxylamine hydrochloride in 100 parts of pyridine are added 20 parts of p-n-caproylaminobenzenesulphonyl chloride. The resulting p-n-caproylaminobenzenesulphonhydroxamide is separated and purified as in Example 1. It melts at 170–175° C. (uncorrected) with decomposition.

EXAMPLE 5.—*Preparation of p-gamma-methylvalerylaminobenzenesulphonhydroxamide.*—To 30 parts of hydroxylamine hydrochloride in 85 parts of pyridine are added 49 parts of p-gamma-methylvalerylaminobenzene-sulphonyl chloride with stirring. The resulting p-gamma-methylvalerylaminobenzenesulphonhydroxamide is purified and separated as in Example 1. It melts at 153–157° C. (uncorrected).

EXAMPLE 6.—*Preparation of p-acetoacetylaminobenzenesulphonhydroxamide.*—To 4 parts of hydroxylamine hydrochloride in 50 parts of pyridine are added 12 parts of p-acetoacetylaminobenzenesulphonyl chloride. The resulting p-acetoacetylaminobenzenesulphonhydroxamide is separated and purified as in Example 1. It melts at 221–222° C. (uncorrected).

EXAMPLE 7.—*Preparation of p-isovalerylaminobenzenesulphonhydroxamide.*—To 14 parts of hydroxylamine hydrochloride in 75 parts of pyridine are added 42 parts of p-isovalerylaminobenzenesulphonyl chloride. p-Isovalerylaminobenzenesulphonhydroxamide is separated and purified as in Example 1. It melts at 165–169° C. (uncorrected) with decomposition.

The foregoing examples illustrate the production of certain of the new products. Instead of using the particular p-acylaminobenzenesulphonyl halides of the examples, other p-acylaminobenzenesulphonyl halides, including those in which the acyl group is one of those previously referred to, may be used for the production of the new and valuable compounds, so long as the acyl group contains at least four carbon atoms. In general, products derived from the aliphatic carboxylic acids have important advantages over the other new products.

We claim:

1. Compounds of the formula

in which RCO is the acyl radical corresponding to a carboxylic acid having at least four carbon atoms.

2. p - Acylaminobenzenesulphonhydroxamides, in which the acyl group corresponds to a carboxylic acid and has at least four carbon atoms.

3. Compounds of the formula

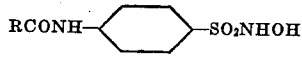

in which R is an alkyl group containing at least 3 carbon atoms.

4. p-Valerylaminobenzenesulphonhydroxamides.

5. p-Caproylaminobenzenesulphonhydroxamides.

6. p-Heptoylaminobenzenesulphonhydroxamides.

MAURICE L. MOORE.
ELLIS MILLER.